United States Patent
Jo et al.

(10) Patent No.: US 10,930,931 B2
(45) Date of Patent: Feb. 23, 2021

(54) POSITIVE ELECTRODE ACTIVE MATERIAL FOR LITHIUM SECONDARY BATTERY INCLUDING HIGH-VOLTAGE LITHIUM COBALT OXIDE WITH DOPING ELEMENT AND METHOD OF PREPARING THE SAME

(71) Applicant: LG Chem, Ltd., Seoul (KR)

(72) Inventors: Chi Ho Jo, Daejeon (KR); Bo Ram Lee, Daejeon (KR); Sung Bin Park, Daejeon (KR); Hyuck Hur, Daejeon (KR); Young Uk Park, Daejeon (KR); Wang Mo Jung, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 15/765,402

(22) PCT Filed: Jun. 28, 2017

(86) PCT No.: PCT/KR2017/006823
§ 371 (c)(1),
(2) Date: Apr. 2, 2018

(87) PCT Pub. No.: WO2018/004250
PCT Pub. Date: Jan. 4, 2018

(65) Prior Publication Data
US 2018/0309123 A1    Oct. 25, 2018

(30) Foreign Application Priority Data

Jun. 28, 2016 (KR) .................... 10-2016-0080569
Jun. 27, 2017 (KR) .................... 10-2017-0081193

(51) Int. Cl.
*H01M 4/525* (2010.01)
*H01M 4/04* (2006.01)
(Continued)

(52) U.S. Cl.
CPC ......... *H01M 4/525* (2013.01); *H01M 4/0407* (2013.01); *H01M 4/0471* (2013.01);
(Continued)

(58) Field of Classification Search
CPC ............. H01M 4/0407; H01M 4/8842; H01M 10/0525; H01M 2004/028; H01M 4/62;
(Continued)

(56) References Cited

U.S. PATENT DOCUMENTS

2003/0211235 A1    11/2003  Suh et al.
2004/0258836 A1*   12/2004  Besenhard ............. B82Y 30/00
                                                        427/180
(Continued)

FOREIGN PATENT DOCUMENTS

CN    103682326 A    3/2014
CN    104124448 A    10/2014
(Continued)

OTHER PUBLICATIONS

Search report from International Application No. PCT/KR2017/006823, dated Sep. 20, 2017.
(Continued)

*Primary Examiner* — Jonathan G Jelsma
*Assistant Examiner* — Omar M Kekia
(74) *Attorney, Agent, or Firm* — Lerner, David, Littenberg, Krumholz & Mentlik, LLP

(57) ABSTRACT

Provided are positive electrode active material particles for a secondary battery which include a lithium cobalt oxide, a coating layer including element A and formed on a surface of particles of the lithium cobalt oxide, and a dopant containing element B which is substituted in the lithium cobalt oxide, wherein the element A and the element B are each independently at least one selected from the group consisting of aluminum (Al), titanium (Ti), magnesium
(Continued)

(Mg), zirconium (Zr), barium (Ba), calcium (Ca), tantalum (Ta), niobium (Nb), and molybdenum (Mo), and a molar ratio of the element A in the coating layer:the element B of the dopant is greater than 1:1 to 10:1.

20 Claims, 1 Drawing Sheet

(51) Int. Cl.
    *H01M 4/131*      (2010.01)
    *H01M 4/62*      (2006.01)
    *H01M 4/1391*      (2010.01)
    *H01M 4/36*      (2006.01)
    *H01M 4/88*      (2006.01)
    *H01M 10/0525*      (2010.01)
    *H01M 4/02*      (2006.01)

(52) U.S. Cl.
    CPC ......... *H01M 4/131* (2013.01); *H01M 4/1391* (2013.01); *H01M 4/366* (2013.01); *H01M 4/62* (2013.01); *H01M 4/8842* (2013.01); *H01M 10/0525* (2013.01); *H01M 2004/028* (2013.01)

(58) Field of Classification Search
    CPC .... H01M 4/1391; H01M 4/366; H01M 4/131; H01M 4/525; H01M 4/0471
    USPC ........................................................ 429/322
    See application file for complete search history.

(56) References Cited

U.S. PATENT DOCUMENTS

| | | |
|---|---|---|
| 2013/0101893 A1 | 4/2013 | Dai et al. |
| 2014/0087254 A1* | 3/2014 | Li .................. H01M 4/366 |
| | | 429/219 |
| 2015/0147655 A1 | 5/2015 | Park et al. |
| 2016/0156032 A1 | 6/2016 | Lee et al. |
| 2016/0336595 A1 | 11/2016 | Choi et al. |
| 2017/0077496 A1* | 3/2017 | Liu .................. H01M 4/362 |
| 2017/0222225 A1 | 8/2017 | Kang et al. |

FOREIGN PATENT DOCUMENTS

| | | |
|---|---|---|
| JP | 2003331845 A | 11/2003 |
| KR | 20010047852 A | 6/2001 |
| KR | 20100056106 A | 5/2010 |
| KR | 20140072119 A | 6/2014 |
| KR | 20150026864 A | 3/2015 |
| KR | 20160040117 A | 4/2016 |
| KR | 20160045029 A | 4/2016 |
| KR | 20160064881 A | 6/2016 |
| WO | 2015115699 A1 | 8/2015 |
| WO | 2016053051 A1 | 4/2016 |
| WO | 2016053053 A1 | 4/2016 |

OTHER PUBLICATIONS

Extended European Search Report including Written Opinion for Application No. 17820526.6 dated Sep. 13, 2018, 9 pages.
Chinese Search Report for Application No. CN2017800035765 dated Jun. 24, 2020.

* cited by examiner

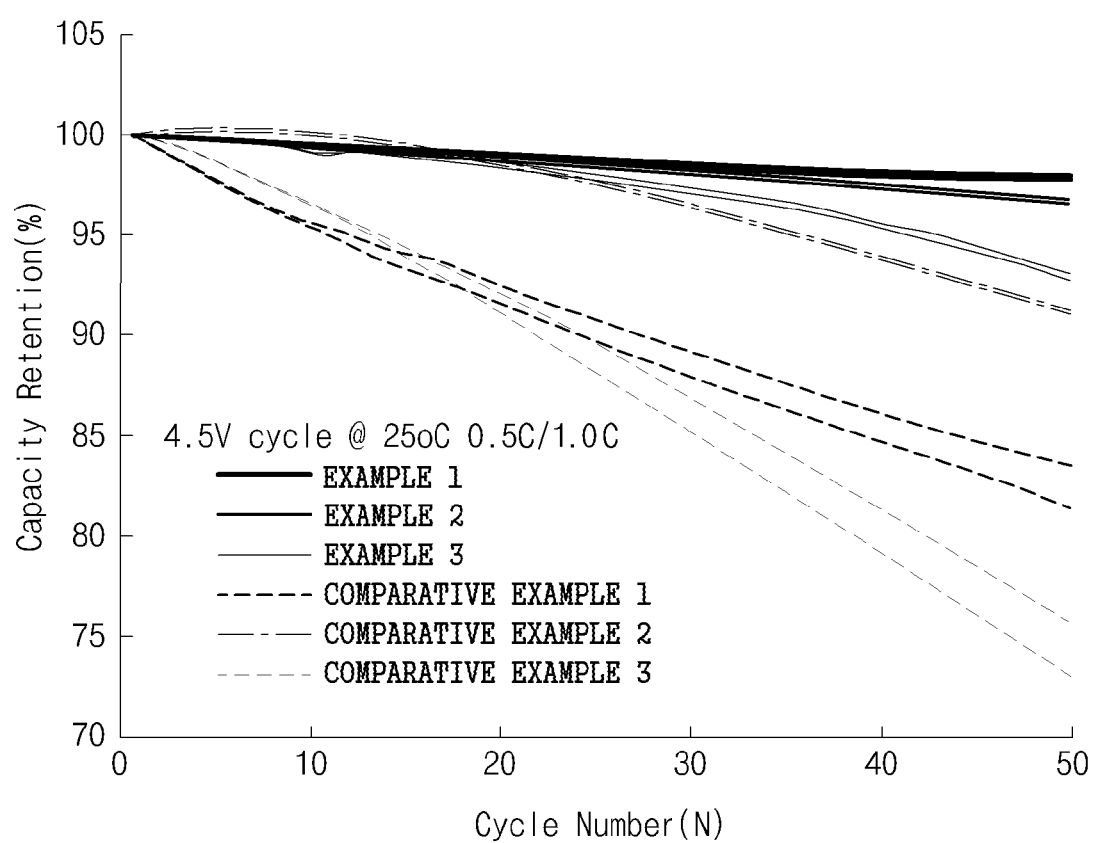

POSITIVE ELECTRODE ACTIVE MATERIAL FOR LITHIUM SECONDARY BATTERY INCLUDING HIGH-VOLTAGE LITHIUM COBALT OXIDE WITH DOPING ELEMENT AND METHOD OF PREPARING THE SAME

CROSS-REFERENCE TO RELATED APPLICATIONS

The present application is a national phase entry under 35 U.S.C. § 371 of International Application No. PCT/KR2017006823 filed Jun. 28, 2017, which claims priority from Korean Patent Application Nos. 10-2016-0080569, filed on Jun. 28, 2016, and 10-2017-0081193, filed on Jun. 27, 2017, in the Korean Intellectual Property Office, the disclosure of which are incorporated herein by reference.

TECHNICAL FIELD

The present invention relates to a positive electrode active material for a lithium secondary battery including a high-voltage lithium cobalt oxide with a doping element and a method of preparing the same.

BACKGROUND ART

Demand for secondary batteries as an energy source has been significantly increased as technology development and demand with respect to mobile devices have increased, and, among these secondary batteries, lithium secondary batteries having high energy density, high operating potential, long cycle life, and low self-discharging rate have been commercialized and widely used.

Also, in line with growing concerns about environmental issues, a significant amount of research into electric vehicles and hybrid electric vehicles, which may replace vehicles using fossil fuels, such as gasoline vehicle and diesel vehicle, one of major causes of air pollution, has been conducted. Nickel-metal hydride secondary batteries have been mainly used as power sources of the electric vehicles and hybrid electric vehicles. However, research into the use of lithium secondary batteries having high energy density and discharge voltage has been actively conducted and some of the research are in a commercialization stage.

Currently, $LiCoO_2$, a ternary component system (NMC/NCA), $LiMnO_4$, and $LiFePO_4$ have been used as positive electrode materials of the lithium secondary batteries. With respect to $LiCoO_2$ among these materials, since there is a limitation in that the price of cobalt is high and capacity is lower than that of the ternary component system at the same voltage, the amount of the ternary component system used is gradually increased to obtain a high-capacity secondary battery.

However, with respect to $LiCoO_2$, since overall physical properties, such as rolling density, are excellent and electrochemical properties, such as cycle characteristics, are excellent, the $LiCoO_2$ has been widely used so far. However, the $LiCoO_2$ has limitations in that charge and discharge capacity is low at about 150 mAh/g and life characteristics are rapidly reduced due to an unstable crystal structure at a voltage of 4.3 V or more, and the $LiCoO_2$ has a risk of fire caused by a reaction with an electrolyte solution.

In particular, when a high voltage is applied to the $LiCoO_2$ for the development of a high capacity secondary battery, the possibility of surface instability and structural instability is increased as the amount of lithium (Li) used is increased. In order to address this limitation, a technique of coating or doping a metal, such as aluminum (Al), titanium (Ti), magnesium (Mg), or zirconium (Zr), on the surface of the $LiCoO_2$ has typically been proposed.

However, in a case in which excessive metal coating or metal doping is performed on the $LiCoO_2$ to secure high-voltage stability, energy capacity of the active material is significantly reduced to reduce battery performance. Also, since its properties vary depending on a total amount of the metallic element included in the active material, a doping amount, and a coating amount, the battery performance is not only significantly affected, but high-voltage durability is also significantly changed, and thus, it was difficult to set an appropriate range.

Therefore, there is a high need to develop a lithium cobalt oxide-based positive electrode active material which may secure structural stability without performance degradation even at a high voltage.

DISCLOSURE OF THE INVENTION

Technical Problem

The present invention is provided to solve technical problems of the related art.

As a result of in-depth research and various experiments, the present inventors confirmed that, in a lithium cobalt oxide including a substitution element and a coating layer formed on a surface of particles, the desired effect may be achieved when an amount of element A in the coating layer formed on the surface of the particles is relatively greater than an amount of element B of a dopant as described later, thereby leading to the completion of the present invention.

Technical Solution

According to an aspect of the present invention, there is provided a positive electrode active material for a secondary battery including:

a lithium cobalt oxide;

a coating layer including element A and formed on a surface of particles of the lithium cobalt oxide; and a dopant containing element B which is substituted in the lithium cobalt oxide, wherein the element A and the element B are each independently at least one selected from the group consisting of aluminum (Al), titanium (Ti), magnesium (Mg), zirconium (Zr), barium (Ba), calcium (Ca), tantalum (Ta), niobium (Nb), and molybdenum (Mo), and a molar ratio of the element A in the coating layer:the element B of the dopant is greater than 1:1 to 10:1.

According to another aspect of the present invention, there is provided a method of preparing the positive electrode active material for a secondary battery including processes of:

(a) mixing a lithium precursor, a cobalt oxide, and a doping precursor including element B and performing primary sintering to prepare a spherical lithium cobalt oxide; and (b) mixing the lithium cobalt oxide of process (a) and a compound including element A and performing secondary sintering.

According to another aspect of the present invention, there is provided a positive electrode which is prepared by coating a current collector with a slurry including the positive electrode active material for a secondary battery, a conductive agent, and a binder; and a lithium secondary battery including the positive electrode, a negative electrode, and an electrolyte solution.

Advantageous Effects

Since a positive electrode active material according to the present invention is prepared by allowing an amount of element A in a coating layer to be relatively greater than an amount of element B of a dopant, specifically, a molar ratio of the element A:the element B to be greater than 1:1 to 10:1, while forming the coating layer including the metallic element A on a surface of particles of a lithium cobalt oxide and doping the metallic element B in the lithium cobalt oxide, the element A and element B included at an appropriate ratio in the coating layer and dopant are preferentially oxidized over cobalt (Co) under charging conditions of 4.4 V or more to maintain stability of an internal structure of the positive electrode active material particles and increase surface stability by suppressing changes in surface structure of the positive electrode active material. Thus, there is an effect that the positive electrode active material may operate in the optimal range in which the reduction of cycle characteristics of a secondary battery at a high voltage may be prevented.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

The FIGURE is a graph illustrating capacity retentions of lithium secondary batteries including positive electrode active materials prepared in Examples 1 to 3 and Comparative Examples 1 to 3 depending on cycles.

MODE FOR CARRYING OUT THE INVENTION

Thus, a positive electrode active material for a secondary battery according to the present invention includes:

a lithium cobalt oxide;

a coating layer including element A and formed on a surface of particles of the lithium cobalt oxide; and a dopant containing element B which is substituted in the lithium cobalt oxide, wherein the element A and the element B are each independently at least one selected from the group consisting of aluminum (Al), titanium (Ti), magnesium (Mg), zirconium (Zr), barium (Ba), calcium (Ca), tantalum (Ta), niobium (Nb), and molybdenum (Mo), and a molar ratio of the element A in the coating layer:the element B of the dopant is greater than 1:1 to 10:1.

In general, in a case in which a lithium cobalt oxide is used as a positive electrode active material at a high voltage, its crystal structure is damaged while a large amount of lithium ions is released from lithium cobalt oxide particles, and thus, the unstable crystal structure may be collapsed to reduce reversibility. In addition, when $Co^{3+}$ or $Co^{+4}$ ions, which are present on the surface of the lithium cobalt oxide particles in a state in which the lithium ions are released, are reduced by an electrolyte solution, since oxygen is deintercalated from the crystal structure, the above-described structural collapse is further promoted.

Thus, in order to stably use the lithium cobalt oxide at a high voltage, the crystal structure is stably maintained even if the large amount of the lithium ions is released and a side reaction between the Co ions and the electrolyte solution may also be suppressed.

Therefore, in the present invention, since the positive electrode active material is prepared by allowing an amount of the element A in the coating layer to be relatively greater than an amount of the element B of the dopant, specifically, the molar ratio of the element A in the coating layer:the element B of the dopant to be greater than 1:1 to 10:1, while forming the coating layer including the metal on the surface of the particles of the lithium cobalt oxide and doping the metal in the lithium cobalt oxide, the element A and element B included at an appropriate ratio in the coating layer and dopant are preferentially oxidized over cobalt (Co) under charging conditions of 4.4 V or more to maintain stability of an internal structure of the positive electrode active material particles and also increase surface stability by suppressing changes in surface structure of the positive electrode active material. Thus, the reduction of cycle characteristics of the secondary battery at a high voltage may be effectively prevented.

Specifically, the dopant may provide structural stability by being preferentially oxidized over the Co under charging conditions of 4.4 V or more, and the coating layer may provide stability of the surface of the lithium cobalt oxide particles.

In a specific example, the lithium cobalt oxide may have a composition of the following Formula 1.

$$Li_aM_bMe_cCo_{1-(b+c)}O_2 \quad \text{[Formula 1]}$$

In Formula 1, M and Me are at least one selected from the group consisting of Al, Ti, Mg, Zr, Ba, Ca, Ta, Nb, and Mo;

$0.95 \leq a \leq 1.05$;

$0 < b \leq 0.2$; and $0 \leq c \leq 0.2$.

In another specific example of the present invention, the lithium cobalt oxide may have a composition of the following Formula 2 including a lithium-excess thin film on a surface thereof.

$$Li_x(LiM_bMe_cCo_{1-(b+c)}O_2) \quad \text{[Formula 2]}$$

In Formula 2, M and Me are each independently at least one selected from the group consisting of Al, Ti, Mg, Zr, Ba, Ca, Ta, Nb, and Mo;

$0 < x \leq 0.1$;

$0 < b \leq 0.05$; and $0 \leq c \leq 0.05$.

Herein, the M and Me are the doping element B.

Specifically, the element B may be at least one selected from the group consisting of Al, Mg, Zr, and Ti, particularly may be at least one selected from the group consisting of Al, Mg, and Ti, and, more particularly, may be Mg and Ti.

In a specific example, the lithium cobalt-based oxide having the composition of Formula 1 may specifically be $LiCo_{0.998}Mg_{0.001}Ti_{0.001}O_2$, $LiCo_{0.995}Mg_{0.002}Al_{0.003}O_2$, $LiCo_{0.999}Mg_{0.001}O_2$, $LiCo_{0.996}Mg_{0.002}Ti_{0.002}O_2$, $LiCo_{0.997}Mg_{0.002}Al_{0.001}O_2$, or $LiCo_{0.996}Mg_{0.002}Ti_{0.001}Al_{0.001}O_2$, and the lithium cobalt-based oxide having the composition of Formula 2 may specifically be $Li_{0.05}(LiCo_{0.998}Mg_{0.001}Ti_{0.001}O_2)$ $Li_{0.1}$ ($LiCo_{0.995}Mg_{0.002}Al_{0.003}O_2$), $Li_{0.02}$ ($LiCo_{0.999}Mg_{0.001}O_2$), $Li_{0.06}$ ($LiCo_{0.996}Mg_{0.002}Ti_{0.002}O_2$), $Li_{0.08}$ ($LiCo_{0.997}Mg_{0.002}Al_{0.001}O_2$), or $Li_{0.09}$ ($LiCo_{0.996}Mg_{0.002}Ti_{0.001}Al_{0.001}O_2$).

Similarly, in a specific example, the coating element A may be at least one selected from the group consisting of Al, Mg, Zr, and Ti, and may particularly be Mg and Ti.

The coating layer including the element A may be formed by sintering, and may specifically include at least one selected from the group consisting of $Al_3O_4$, $ZrO_2$, Al(OH), $Mg(OH)_2$, $Al_2O_3$, MgO, ZrO, $Li_2ZrO_3$, and $TiO_2$.

Specifically, the element A and the element B may be the same element. In a case in which the element A and the element B are the same, excellent results may be obtained in terms of both doping effect and coating effect. In other words, when contribution of the element B of the dopant to the structural stability is large, it may be said that it also has an excellent effect on the surface stability of the coating layer including the element A that is the same as the element B. Thus, it is more desirable than including different elements.

In a specific example, the molar ratio of the element A in the coating layer:the element B of the dopant may be greater than 1:1 to 10:1, particularly may be in a range of 1.3:1 to 5:1, 1.3:1 to 3.5:1, 1.3:1 to 3.2:1, or 1.3:1 to 3:1, and, more particularly, may be in a range of 1.3:1 to 2.5:1.

In a case in which the molar ratio of the element A in the coating layer:the element B of the dopant is outside the above range, i.e., greater than 10:1, since mobility of the lithium ions may be reduced by the excessive amount of the metal included in the coating layer, output characteristics may be reduced. Also, since the amount of the lithium cobalt oxide in the relatively same volume is decreased, the reduction of capacity may occur. Furthermore, in a case in which the amount of the doping element is excessively small, there is little doping effect which increases the structural stability of the active material.

In contrast, in a case in which the molar ratio of the element A in the coating layer:the element B of the dopant is equal to or less than 1:1, since the effect due to the coating may not be sufficiently obtained or a ratio of the metal B on the surface of the positive electrode active material particles is excessively increased, overall capacity of the positive electrode active material may be relatively reduced. Also, since a coating area is decreased due to the small molar ratio of the coating layer, surface corrosion of the positive electrode active material may be accelerated to degrade life and storage characteristics.

For example, in a case in which the element A or the element B each includes a heterogeneous material, the molar ratio of the element A in the coating layer:the element B of the dopant may include a sum of the heterogeneous element.

Specifically, the amount of the element A in the coating layer may be in a range of greater than 0 ppm to 20,000 ppm, particularly 500 ppm to 1,500 ppm, and more particularly 700 ppm to 1,000 ppm based on a total weight of the positive electrode active material.

In a case in which the element A is coated in an amount outside the above range, it is not desirable that the effect of securing the surface stability of the active material is not sufficiently achieved.

Also, the amount of the element B of the dopant may be in a range of greater than 0 ppm to 20,000 ppm, particularly 500 ppm to 1,500 ppm, and more particularly 700 ppm to 1,000 ppm based on the total weight of the positive electrode active material.

In a case in which the element B is coated in an amount outside the above range, it is not desirable that the effect of securing the structural stability in the active material is not sufficiently achieved.

In a case in which the element A and the element B are the same, the ppm amount of the element A may be greater than the ppm amount of the element B.

Furthermore, the present invention provides a method of preparing the positive electrode active material for a secondary battery, and the preparation method includes processes of:

(a) mixing a lithium precursor, a cobalt oxide, and a doping precursor including element B and performing primary sintering to prepare a spherical lithium cobalt oxide; and (b) mixing the lithium cobalt oxide of process (a) and a compound including element A and performing secondary sintering.

That is, as in the method of preparing the positive electrode active material, the doping precursor including element B in a precursor stage is mixed in an appropriate amount and is subjected to primary sintering to prepare lithium cobalt-based oxide particles in which the element B is substituted, and a positive electrode active material having a coating layer formed thereon may be prepared by a process of coating a surface of the lithium cobalt-based oxide particles with a compound including an appropriate amount of element A and performing secondary sintering. In this case, the amount of the element A in the coating layer is set to be greater than the amount of the element B of the dopant.

Thus, in a case in which the positive electrode active material for a secondary battery of the present invention is prepared by the above preparation method, since the positive electrode active material is prepared by allowing the amount of the element A in the coating layer, which is formed on the surface of the lithium cobalt oxide particles, to be relatively greater than the amount of the element B of the dopant, the element A and element B included at an appropriate ratio in the coating layer and dopant are preferentially oxidized over cobalt (Co) under charging conditions of 4.4 V or more, and thus, the effect of achieving the stability of the internal structure of the positive electrode active material particles and the effect of increasing the surface stability by suppressing changes in the surface structure of the positive electrode active material are obtained so that the positive electrode active material may operate in the optimal range in which the reduction of the cycle characteristics of the secondary battery at a high voltage may be prevented.

Specifically, in order to first prepare the positive electrode active material, a lithium precursor, a cobalt oxide, and a doping precursor including element B are mixed as in process (a). A mixing molar ratio of the lithium precursor, the cobalt oxide, and the doping precursor including element B may be in a range of 0.95:0.90:0.001 to 1.10:1.05:0.05.

For example, the type of the cobalt oxide is not limited, but the cobalt oxide may preferably be at least one selected from the group consisting of $Co_3O_4$, $CoCO_3$, $Co(NO_3)_2$, and $Co(OH)_2$.

The lithium precursor is not particularly limited as long as it is a compound including a lithium source, but the lithium precursor may preferably be at least one selected from the group consisting of $Li_2CO_3$, LiOH, $LiNO_3$, $CH_3COOLi$, and $Li_2(COO)_2$.

Also, the doping precursor may be at least one selected from the group consisting of a metal, a metal oxide, and a metal salt. The metal salt, for example, may include an acetic acid salt, nitrate, or sulfate of the metallic element B, but the present invention is not limited thereto.

Subsequently, a spherical lithium cobalt oxide is prepared by performing primary sintering of a mixture of the lithium precursor, the cobalt oxide, and the doping precursor including element B.

The primary sintering may be performed in a temperature range of 800° C. to 1,200° C. for 8 hours to 12 hours. For example, in a case in which the primary sintering is performed at a temperature of less than 800° C. or is performed for less than 8 hours, since the doping is not well performed, the internal structure of the positive electrode active material particles may not be stably formed. In contrast, in a case in which the primary sintering is performed at a temperature of greater than 1,200° C. or is performed for greater than 12 hours, physical and chemical properties of the lithium cobalt oxide may vary to cause performance degradation.

Next, after the lithium cobalt oxide of process (a) and a compound including element A are mixed, secondary sintering is performed.

The compound including element A which constitutes the coating layer may preferably include at least one selected from the group consisting of $Al_3O_4$, $ZrO_2$, $Al(OH)$, $Mg(OH)_2$, $Al_2O_3$, $MgO$, $ZrO$, $Li_2ZrO_3$, and $TiO_2$, but the present invention is not limited thereto.

The secondary sintering may be performed in a temperature range of 400° C. to 800° C. for 3 hours to 8 hours.

For example, in a case in which the secondary sintering is performed at a temperature of less than 400° C. or is performed for less than 3 hours, since the coating is not well performed on the surface of the positive electrode active material, the surface structure of the positive electrode active material particles may not be stably formed. In contrast, in a case in which the secondary sintering is performed at a temperature of greater than 800° C. or is performed for greater than 8 hours, it is not desirable that the physical and chemical properties of the lithium cobalt-based oxide constituting the positive electrode active material particles may vary to cause performance degradation.

The present invention also provides a positive electrode which is prepared by coating a current collector with a slurry including the positive electrode active material for a secondary battery, a conductive agent, and a binder.

Specifically, the positive electrode, for example, may be prepared by coating a positive electrode collector with a positive electrode material mixture in which a positive electrode active material composed of the above-described positive electrode active material particles, a conductive agent, and a binder are mixed, and a filler may be further added to the positive electrode material mixture, if necessary.

The positive electrode collector is generally prepared to a thickness of 3 μm to 300 μm, and is not particularly limited as long as it has high conductivity without causing adverse chemical changes in the battery. For example, one selected from stainless steel, aluminum, nickel, titanium, fired carbon, or aluminum or stainless steel that is surface-treated with one of carbon, nickel, titanium, silver, or the like may be used, and, specifically, aluminum may be used. Microscopic irregularities may be formed on the surface of the collector to improve the adhesion of the positive electrode active material, and the positive electrode collector may be used in various shapes such as a film, a sheet, a foil, a net, a porous body, a foam body, a non-woven fabric body, and the like.

The conductive agent is commonly added in an amount of 0.1 wt % to 30 wt % based on a total weight of the mixture including the positive electrode active material. The conductive agent is not particularly limited so long as it has conductivity without causing adverse chemical changes in the battery, and conductive materials, for example, graphite such as natural graphite and artificial graphite; carbon black such as acetylene black, Ketjen black, channel black, furnace black, lamp black, and thermal black; conductive fibers such as carbon fibers or metal fibers; metal powder, such as fluorinated carbon powder, aluminum powder, and nickel powder; conductive whiskers such as zinc oxide whiskers and potassium titanate whiskers; conductive metal oxide such as titanium oxide; or polyphenylene derivatives may be used.

The binder is a component that assists in the binding between the active material and the conductive agent and in the binding with the current collector, wherein the binder is typically added in an amount of 0.1 wt % to 30 wt % based on the total weight of the mixture including the positive electrode active material. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

The present invention also provides a secondary battery including the positive electrode, a negative electrode, and an electrolyte solution. The type of the secondary battery is not particularly limited, but specific examples thereof may be lithium secondary batteries, such as a lithium ion battery and a lithium ion polymer battery, having advantages such as high energy density, discharge voltage, and output stability.

In generally, a lithium secondary battery is composed of a positive electrode, a negative electrode, a separator, and a lithium salt-containing non-aqueous electrolyte solution.

Hereinafter, other configurations of the lithium secondary battery will be described.

The negative electrode is prepared by coating and drying a negative electrode active material on a negative electrode collector, and the components included in the above-described positive electrode may be selectively further included, if necessary.

The negative electrode collector is generally prepared to a thickness of 3 μm to 500 μm. The negative electrode collector is not particularly limited as long as it has conductivity without causing adverse chemical changes in the battery, and, for example, copper, stainless steel, aluminum, nickel, titanium, fired carbon, copper or stainless steel that is surface-treated with one of carbon, nickel, titanium, or silver, or an aluminum-cadmium alloy may be used. Also, similar to the positive electrode collector, microscopic irregularities may be formed on the surface of the collector to improve the adhesion of the negative electrode active material, and the negative electrode collector may be used in various shapes such as a film, a sheet, a foil, a net, a porous body, a foam body, or a non-woven fabric body.

As the negative electrode active material, for example, carbon such as hard carbon and graphite-based carbon; a complex metal oxide such as $Li_xFe_2O_3$ ($0 \leq x \leq 1$), $Li_xWO_2$ ($0 \leq x \leq 1$), $Sn_xMe_{1-x}Me'_yO_z$ (Me: manganese (Mn), iron (Fe), lead (Pb), or germanium (Ge); Me': aluminum (Al), boron (B), phosphorous (P), silicon (Si), Groups I, II and III elements, or halogen; $0 < x \leq 1$; $1 \leq y \leq 3$; $1 \leq z \leq 8$); a lithium metal; a lithium alloy; a silicon-based alloy; a tin-based alloy; a metal oxide such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; a conductive polymer such as polyacetylene; or a Li—Co—Ni-based material may be used.

The separator is disposed between the positive electrode and the negative electrode, and an insulating thin film having high ion permeability and mechanical strength is used. The separator generally has a pore diameter of 0.01 µm to 10 µm and a thickness of 5 µm to 300 µm. For example, an olefin-based polymer such as chemical resistant and hydrophobic polypropylene; and a sheet or nonwoven fabric formed of glass fibers or polyethylene are used as the separator. In a case in which a solid electrolyte, such as a polymer, is used as an electrolyte, the solid electrolyte may also serve as the separator.

The lithium salt-containing non-aqueous electrolyte solution is composed of a non-aqueous electrolyte solution and a lithium salt. As the non-aqueous electrolyte solution, a non-aqueous organic solvent, an organic solid electrolyte, or an inorganic solid electrolyte is used, but the present invention is not limited thereto.

Examples of the non-aqueous organic solvent may be an aprotic organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydroxy franc, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

Examples of the organic solid electrolyte may be a polyethylene derivative, a polyethylene oxide derivative, a polypropylene oxide derivative, a phosphate ester polymer, poly agitation lysine, polyester sulfide, polyvinyl alcohol, polyvinylidene fluoride, and a polymer containing an ionic dissociation group.

Examples of the inorganic solid electrolyte may be nitrides, halides, and sulfates of Li, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte and, for example, may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

Also, in order to improve charge/discharge characteristics and flame retardancy, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, and aluminum trichloride, for example, may be added to the non-aqueous electrolyte solution. In some cases, halogen-containing solvents, such as carbon tetrachloride and ethylene trifluoride, may be further included in order to impart incombustibility, carbon dioxide gas may be further included in order to improve high-temperature storage characteristics, and fluoro-ethylene carbonate (FEC) or propene sultone (PRS) may be further included.

The present invention also provides a battery pack including the secondary battery and a device including the battery pack, but, since the battery pack and device as above-described are known in the art, detailed descriptions thereof will be omitted.

Examples of the device may be a notebook computer, a netbook, a tablet PC, a mobile phone, an MP3, a wearable electronic device, a power tool, an electric vehicle (EV), a hybrid electric vehicle (HEV), a plug-in hybrid electric vehicle (PHEV), an electric bicycle (E-bike), an electric scooter (E-scooter), an electric golf cart, or a power storage system, but the present invention is not limited thereto.

Hereinafter, the present invention will be described according to examples, but the following examples are merely provided to allow for a clearer understanding of the present invention, rather than to limit the scope thereof.

Example 1

$Co_3O_4$, LiOH, $TiO_2$, and MgO were dry-mixed such that a molar ratio of Li:Co:Ti:Mg was 1.0:0.998:0.0007:0.0008 and an amount of $TiO_2$ and MgO was 1,000 ppm based on a total positive electrode active material. Then, primary sintering was performed in a furnace at 1,030° C. for 10 hours to prepare a lithium cobalt oxide, and, in order to form a coating layer on the prepared lithium cobalt oxide, coating was performed by dry-mixing the above-prepared lithium cobalt oxide, $TiO_2$, and MgO such that the amount of $TiO_2$ and MgO was 1,300 ppm based on the total positive electrode active material (molar ratio of coating:doping=1.3:1). Thereafter, secondary sintering was performed in a furnace at 530° C. for 6 hours to synthesize a positive electrode active material.

Positive electrode active material particles thus prepared, PVdF as a binder, and natural graphite as a conductive agent were mixed well in NMP such that a weight ratio of the positive electrode active material:the binder:the conductive agent was 96:2:2, and the mixture was then coated on a 20 µm thick Al foil and dried at 130° C. to prepare a positive electrode.

A lithium foil was used as a negative electrode, and an electrolyte solution, in which 1M $LiPF_6$ was dissolved in a solvent composed of EC:DMC:DEC (=1:2:1), was used to prepare a half coin cell.

Example 2

A positive electrode active material, a positive electrode, and a half coin cell including the positive electrode were prepared in the same manner as in Example 1 except that a lithium cobalt oxide was prepared such that an amount of $TiO_2$ and MgO was 750 ppm based on the total positive electrode active material, and the above-prepared lithium cobalt oxide, $TiO_2$, and MgO were dry-mixed such that the amount of $TiO_2$ and MgO was 2,400 ppm based on the total positive electrode active material (molar ratio of coating:doping=3.2:1).

Example 3

A positive electrode active material, a positive electrode, and a half coin cell including the positive electrode were prepared in the same manner as in Example 1 except that a lithium cobalt oxide was prepared such that an amount of $TiO_2$ and MgO was 500 ppm based on the total positive electrode active material, and the above-prepared lithium cobalt oxide, $TiO_2$, and MgO were dry-mixed such that the amount of $TiO_2$ and MgO was 2,500 ppm based on the total positive electrode active material (molar ratio of coating: doping=5:1).

Comparative Example 1

A positive electrode active material, a positive electrode, and a half coin cell including the positive electrode were prepared in the same manner as in Example 1 except that a lithium cobalt oxide was prepared such that an amount of $TiO_2$ and MgO was 1,200 ppm based on the total positive electrode active material, and the above-prepared lithium cobalt oxide, $TiO_2$, and MgO were dry-mixed such that the amount of $TiO_2$ and MgO was 300 ppm based on the total positive electrode active material (molar ratio of coating: doping=0.4:1).

Comparative Example 2

A positive electrode active material, a positive electrode, and a half coin cell including the positive electrode were prepared in the same manner as in Example 1 except that a lithium cobalt oxide was prepared such that an amount of $TiO_2$ and MgO was 900 ppm based on the total positive electrode active material, and the above-prepared lithium cobalt oxide, $TiO_2$, and MgO were dry-mixed such that the amount of $TiO_2$ and MgO was 900 ppm based on the total positive electrode active material (molar ratio of coating: doping=1:1).

Comparative Example 3

A positive electrode active material, a positive electrode, and a half coin cell including the positive electrode were prepared in the same manner as in Example 1 except that a lithium cobalt oxide was prepared such that an amount of $TiO_2$ and MgO was 3,300 ppm based on the total positive electrode active material, and the above-prepared lithium cobalt oxide, $TiO_2$, and MgO were dry-mixed such that the amount of $TiO_2$ and MgO was 300 ppm based on the total positive electrode active material (molar ratio of coating: doping=11:1).

Experimental Example 1

Charge of the half coin cells prepared in Examples 1 to 3 and Comparative Examples 1 to 3 at 0.5 C to an upper limit voltage of 4.5 V at 25° C. and discharge of the half coin cells at 1.0 C to a lower limit voltage of 3 V were defined as one cycle, and capacity retention in a $50^{th}$ cycle was measured. The results thereof are presented in the following Table 1 and the Figure.

TABLE 1

|  | Capacity retention in the $50^{th}$ cycle (%) |
| --- | --- |
| Example 1 | 97.7 |
| Example 2 | 96.6 |
| Example 3 | 93.1 |
| Comparative Example 1 | 82.9 |
| Comparative Example 2 | 85.7 |
| Comparative Example 3 | 74.1 |

Referring to Table 1, with respect to the half coin cells including the positive electrode active materials of Examples 1 to 3 according to the present invention, since capacity retentions were 93% or more even after 50 cycles despite the fact that the half coin cells were under a high voltage condition of 4.5 V, it may be confirmed that high performance was maintained. It is considered due to the fact that, in a case in which an amount ratio of the metallic elements in the coating layer formed on the surface of the lithium cobalt oxide particles to the metallic elements of the dopant satisfied the range according to the present invention, the coating layer suppressed the collapse of the crystal structure from an outer surface of the lithium cobalt oxide particles and the metallic elements of the dopant prevented the reduction of the capacity retention according to the cycle by suppressing the side reaction between the electrolyte solution and $Co^{+4}$ ions present on a core surface in a state in which lithium ions were released.

In contrast, with respect to the half coin cells of Comparative Examples 1 to 3 in which the amount ratio of the metallic elements in the coating layer to the metallic elements of the dopant was outside the range of the present invention, it may be confirmed that capacity retentions under a high voltage were lower than those of Examples 1 to 3. While specific embodiments of the present invention have been described above, various applications and modifications will become readily apparent to those skilled in the art without departing from the scope of the present invention.

The invention claimed is:

1. A positive electrode active material for a secondary battery, the positive electrode active material comprising:
    a lithium cobalt oxide;
    a coating layer including element A and formed on a surface of particles of the lithium cobalt oxide; and
    a dopant containing element B which is substituted in the lithium cobalt oxide,
    wherein the element A and the element B are each independently at least one selected from the group consisting of aluminum (Al), titanium (Ti), magnesium (Mg), zirconium (Zr), barium (Ba), calcium (Ca), tantalum (Ta), niobium (Nb), and molybdenum (Mo), and
    a molar ratio of the element A in the coating layer: the element B of the dopant is 1.3:1 to 5:1.

2. The positive electrode active material for a secondary battery of claim 1, wherein the dopant provides structural stability by being preferentially oxidized over cobalt (Co) under charging conditions of 4.4 V or more, and the coating layer provides stability of the surface of the lithium cobalt oxide particles.

3. The positive electrode active material for a secondary battery of claim 1, wherein the lithium cobalt oxide has a composition of Formula 1:

$$Li_aM_bMe_cCo_{1-(b+c)}O_2 \quad \text{Formula 1}$$

wherein, in Formula 1,
    M and Me are each independently at least one selected from the group consisting of Al, Ti, Mg, Zr, Ba, Ca, Ta, Nb, and Mo;
    $0.95 \le a \le 1.05$;
    $0 < b \le 0.2$; and
    $0 \le c \le 0.2$.

4. The positive electrode active material for a secondary battery of claim 1, wherein the lithium cobalt oxide has a composition of Formula 2 by including a lithium-excess thin film on a surface thereof:

$$Li_x(LiM_bMe_cCo_{1-(b+c)}O_2) \quad \text{Formula 2}$$

wherein, in Formula 2,
    M and Me are each independently at least one selected from the group consisting of Al, Ti, Mg, Zr, Ba, Ca, Ta, Nb, and Mo;

$0 < x \leq 0.1$;
$0 < b \leq 0.05$; and
$0 \leq c \leq 0.05$.

5. The positive electrode active material for a secondary battery of claim 1, wherein the element A is at least one selected from the group consisting of Al, Mg, Zr, and Ti.

6. The positive electrode active material for a secondary battery of claim 1, wherein the element B is at least one selected from the group consisting of Al, Mg, Zr, and Ti.

7. The positive electrode active material for a secondary battery of claim 1, wherein the element A and the element B are a same element.

8. The positive electrode active material for a secondary battery of claim 1, wherein the coating layer comprises at least one selected from the group consisting of $Al_3O_4$, $ZrO_2$, $Al(OH)$, $Mg(OH)_2$, $Al_2O_3$, $MgO$, $ZrO$, $Li_2ZrO_3$, and $TiO_2$.

9. The positive electrode active material for a secondary battery of claim 1, wherein the molar ratio of the element A: the element B is in a range of 1.3:1 to 2.5:1.

10. The positive electrode active material for a secondary battery of claim 1, wherein an amount of the element A in the coating layer is in a range of greater than 0 ppm to 20,000 ppm based on a total amount of the positive electrode active material.

11. The positive electrode active material for a secondary battery of claim 1, wherein an amount of the element B of the dopant is in a range of greater than 0 ppm to 20,000 ppm based on a total amount of the positive electrode active material.

12. A method of preparing the positive electrode active material for a secondary battery of claim 1, the method comprising processes of:

(a) mixing a lithium precursor, a cobalt oxide, and a doping precursor including element B and performing primary sintering to prepare a spherical lithium cobalt oxide; and (b) mixing the lithium cobalt oxide of process (a) and a compound including element A and performing secondary sintering.

13. The method of claim 12, wherein a mixing molar ratio of the lithium (Li) precursor, the cobalt (Co) oxide, and the doping precursor including element B is in a range of (0.95:0.90:0.001) to (1.10:1.05:0.05).

14. The method of claim 12, wherein the cobalt oxide comprises $Co_3O_4$.

15. The method of claim 12, wherein the lithium precursor comprises at least one selected from the group consisting of $Li_2CO_3$, $LiOH$, $LiNO_3$, $CH_3COOLi$, and $Li_2(COO)_2$.

16. The method of claim 12, wherein the doping precursor comprises at least one selected from the group consisting of a metal, a metal oxide, and a metal salt.

17. The method of claim 12, wherein a temperature of the primary sintering of process (a) is in range of 800° C. to 1,200° C., and a time of the primary sintering is in range of 8 hours to 12 hours.

18. The method of claim 12, wherein a temperature of the secondary sintering of process (b) is in range of 400° C. to 800° C., and a time of the secondary sintering is in a range of 3 hours to 8 hours.

19. A positive electrode comprising the positive electrode active material for a secondary battery of claim 1.

20. A lithium secondary battery comprising the positive electrode of claim 19, a negative electrode, and an electrolyte solution.

* * * * *